No. 736,402. Patented August 18, 1903.

UNITED STATES PATENT OFFICE.

GEORGES JACQUEMIN, OF MALZEVILLE, FRANCE.

PREPARING YEAST.

SPECIFICATION forming part of Letters Patent No. 736,402, dated August 18, 1903.

Application filed May 22, 1901. Serial No. 61,379. (No specimens.)

*To all whom it may concern:*

Be it known that I, GEORGES JACQUEMIN, chemist, a citizen of the French Republic, residing at Malzeville, near Nancy, France, have invented a new and useful Improvement in Preparing Yeasts, of which the following is a specification.

This invention relates to a process for preparing a yeast fermenting at high and low density and also at high and low acidity of the liquids to be fermented. The term "low density" is applied to the density ordinarily employed in distilleries—that is to say, it has reference, for example, to a wort formed from molasses 1070 to 1080 of the centesimal densimeter. The term "high density" is applied to densities higher than those ordinarily used—that is to say, for wort formed from molasses, for example, 1090 to 1100 of the centesimal densimeter.

I begin with the yeast fermenting at high and low density of the wort, and the production of which is hereinafter described. This yeast, which I designate yeast H. D., is prepared with a special view to the fermentation of the different kinds of molasses and sugar-cane juice, but can also be used in the treatment of worts of any composition. It enables me to ferment dilutions of molasses at the high density of 1104 by the centesimal densimeter; but it can also be employed advantageously for dilutions of less density and for juices of sugar-canes or other sugar-producing materials, since in these last two cases it effects the transformation of the sugar into alcohol with a much greater rapidity than if it had not undergone this previous inuring action, and a saving of several hours is gained over work by means of ordinary pure yeasts, which work is nevertheless fairly rapid.

In order to prepare the yeast H. D. in one culture in one of the nutritive media commonly employed in laboratories, I substitute little by little in successive cultures for one portion of the ordinary liquid increasing quantities of a high-density sugar-syrup (the composition of which I will describe) in such a manner as to arrive finally at the cultivation of the yeast solely in this syrup. In practice it will suffice to make five successive cultures at a duration of forty-eight hours each to obtain the result. It is the yeast so prepared and sent out in full fermentation in the syrup itself or having recently finished its evolution with or without separation from the culture liquid which will be employed in distilleries, operating as I shall hereinafter set forth.

In order that my invention may be clearly understood, I may give the following illustration, by way of example, of the preparation of the yeast H. D. I commence by cultivating one hundred grams of ordinary yeast (yeast cultivated by the means ordinarily employed in laboratories of microbiology) in ten liters of nutritive wort employed in laboratories, and preferably in a wort of strong beer—that is to say, an infusion of twenty-five to thirty kilos of malt in one hectoliter of water, which is then filtered and boiled for an hour and cooled to a temperature of 20° centigrade. The yeast is then added and the liquid maintained at a temperature of 20° centigrade for forty-eight hours. I then withdraw a fifth—that is to say, two liters—of the liquid, and I replace these two liters by the same volume of a syrup of sugar of a composition which I will describe below. Then I allow the fermentation to continue always at the temperature of 20° centigrade. Then at the end of forty-eight hours I withdraw two-fifths of the liquid—that is to say, four liters—and I replace them by four liters of the syrup of sugar described below. I continue to allow the fermentation to go on at the temperature of 20° centigrade. Then at the end of forty-eight hours I withdraw three-fifths—that is to say, six liters of the liquid—which I replace by six liters of the syrup of sugar. At the end of another forty-eight hours I withdraw eight liters of the liquid, which I replace by eight liters of syrup. At the end of another forty-eight hours I withdraw all the liquid which covers the yeast, and I replace it by a like quantity of a sugar-syrup. The yeast thus produced is ready to be employed in distilleries.

The sugar-syrup is composed as follows: I dissolve in a liter of water a quantity of saccharose, such that after complete sterilization the syrup has a density of 1104 by the centesimal densimeter at a temperature of +15° centigrade, and I add at the same time as the sugar five grams of tartaric acid, 2.50 grams of phosphate of ammonia, and 2.50 grams of phosphate of lime.

It is to be understood that in order to obtain an analogous result I may vary the nature of the sugar or the composition of the nutritive salts and employ, for example, glucose or molasses instead of refined sugar; but the formula which I indicate after numerous trials is the one which has given me in practice the best results, not only as concerns the ease of work in preparing the yeast but also and especially as regards the activity which this yeast will show when it is in the juices treated.

*Yeast fermenting at high and low density and at high and low acidity, designated "H. A.-H. D." yeast.*—I prepare this yeast, which I designate for convenience "H. A.-H. D." by cultivating the H. D. yeast above described in wort of malt saccharified by the action of its diastase and to which has been subsequently added refined sugar or molasses and nutritive salts and five grams of tartaric acid per liter. In this I make successive cultures, adding to this liquid increasing doses of sulfuric acid up to two grams per liter. The term "nutritive salt" is applied to salts which favor the life of yeasts—for example, phosphate of ammonia.

By way of more detailed example I may explain that I can take one hundred grams of yeast H. D. and cultivate it in ten liters of wort of beer prepared as first described, but with the addition of five grams of tartaric acid and fifty centigrams of sulfuric acid per liter. Then I add refined sugar in such quantity that the density shall be 1104 by the centesimal densimeter at 15° centigrade. I maintain the temperature of fermentation at 20° centigrade for forty-eight hours. Then I decant all the liquid which covers the yeast and replace it by a like quantity—that is to say, ten liters of the same sugared wort of beer at the density indicated, which wort contains five grams of tartaric acid and one gram of sulfuric acid per liter. I maintain the temperature of fermentation at 20° centigrade, and at the end of forty-eight hours I decant all the liquid which covers the yeast and I replace it by ten liters of wort of beer prepared as before described and containing 1.50 grams of sulfuric acid per liter. I maintain the temperature at 20° centigrade. Forty-eight hours later I once more decant this supernatent liquid and replace it by the same quantity—that is to say, ten liters—of the same wort, but containing two grams of sulfuric acid per liter. It is this yeast that is finally obtained which constitutes the yeast H. A. H. D. and possesses the property of easily causing worts to ferment even when they have the high density and the high acidity which has served for the preparation of the yeast. In practice it will suffice to make four successive cultures to obtain the desired result.

It is to be understood that similar results would be attained by cultivating the yeast in a nutritive liquid other than the malt wort and by employing other organic acid, such as citric acid or lactic acid in place of tartaric acid; but the formula which I indicate for the composition of the culture medium is that which has given me the best results, having regard to facility of the work of preparing this yeast and the ultimate activity of the ferment obtained.

The H. A. H. D. yeast is especially prepared for the fermentation of molasses of poor or bad quality and juices of sugar-cane, beet-roots, and other sugar-producing materials infected with bacteria, which it causes to ferment normally in a large vat at an acidity much less than is the case in ordinary working and with a rapidity much greater than all other known methods of fermentation.

I claim as my invention—

1. The process of preparing a yeast fermenting at high and low density, consisting in acclimating a yeast in a sugared liquid having a density of about 1104 by the centesimal densimeter, this preparation being made by means of successive cultures in progressively-acidified saccharine liquids in which the density goes on increasing to the limit indicated.

2. The process of preparing a yeast fermenting at high and low density and high and low acidity, consisting in acclimating a yeast in a sugared liquid having a density of about 1104 by the centesimal densimeter and an acidity equal to that of about five grams tartaric acid and two grams sulfuric acid per liter, this preparation being made by means of successive cultures in sweetened liquids in which the density and the acidity go on increasing to the limits indicated.

In testimony whereof I have signed my name to this specification in the presence of two subscribing witnesses.

GEORGES JACQUEMIN.

Witnesses:
GUSTAVE DUMONT,
EDWARD P. MACLEAN.